United States Patent Office 3,574,070

Patented Apr. 6, 1971

3,574,070

METAL PLATING OVER PLASTIC

Camille Sahely, Wellesley Hills, Mass., assignor to Shipley Company, Inc., Newton, Mass.

No Drawing. Filed May 11, 1967, Ser. No. 637,644

Int. Cl. C23b 5/60

U.S. Cl. 204—30 31 Claims

ABSTRACT OF THE DISCLOSURE

A process for metal plating over plastics characterized by a preliminary treatment step comprising contact of a plastic surface with an emulsion having a first phase that is a solvent for the plastic and a second phase that is emulsified with the first phase and a non-solvent for the plastic. The treatment step with emulsion is preferably used prior to surface conversion of the plastic part and promotes increased bond strength between the plastic substrate and metal coating.

INTRODUCTION

This invention relates to a process for metal plating over plastics characterized by a preliminary treatment step comprising contact of a plastic surface with an emulsion having a first phase that is a solvent for the plastic and a second phase that is emulsifiable with the first phase, preferably water, and a non-solvent for the plastic.

BACKGROUND OF THE INVENTION

Numerous methods are proposed in the prior art for depositing a metal coating over plastic. The method most commonly used involves surface converting a plastic part with a material such as an oxidizing solution of sulfuric acid and a source of hexavalent chromium ions, deposition of a conductive, adherent metallic film by chemical reduction followed by electrodeposition of an intermediate layer, frequently copper, and finally a layer of a desired outer metal coating such as chromium, nickel, gold, silver or zinc. Such a method is described, in greater detail, by Harold Narcus, Metallizing of Plastics, Reinhold Publishing Corporation, New York, 1960, Chapter 2. Only moderate bond strength between a plastic substrate and metal coating is obtained by this method. Also relatively high temperatures are required for the surface converting step and careful control of the chromium ion concentration is necessary.

Plastics are relatively inert to metals and to promote a stronger bond between a plastic substrate and a metallic coating the prior art has frequently resorted to roughening the plastic surface to provide locking or keying between the surface and its coating. Roughening has been accomplished mechanically using wet or dry abrasives and chemically using an acidic etch solution or a solvent for the plastic to soften its surface. These procedures generally lead to a composite having an adequate bond between substrate and coating, but due to relatively large visible irregularities on the plastic surface formed during the roughening operation, a thick metal coating must be applied to avoid surface defects and obtain a coating having a smooth, highly polished appearance. Furthermore, it is known that conventional plating procedures are not broadly applicable to all plastics and generally, a specially prepared higher cost plateable grade plastic, free of molding stress must be used to obtain the necessary bond between substrate and coating.

STATEMENT OF THE INVENTION

The present invention is predicated upon the discovery that immersion of a plastic in an emulsion of a first phase that is a solvent for the plastic and a second phase that is emulsifiable with the first phase and a non-solvent for the plastic results in the formation of minute pores on the surface of the plastic without formation of visible irregularities. The pores serve to assist in anchoring a subsequently applied metal coating to the plastic substrate and it has been found that bond strength between substrate and coating is substantially increased when emulsion treatment is used rather than prior art surface roughening procedures. Also, because of the absence of visible surface irregularities, a thinner coating of metal may be used without detracting from surface appearance. Furthermore, the process is applicable to substantially all plastics whether of a "plateable" grade or not.

Accordingly, an object of this invention is to provide a process for metal plating over plastics characterized by a preliminary treatment step comprising contact of a plastic surface with an emulsion formed from a solvent and non-solvent for the plastic to form minute pores on the plastic surface suitable for firmly anchoring a metal coating to the plastic surface. Another object of the invention is to provide a process for metal plating over plastics that is generally applicable to all plastics whether of a "plateable" or "non-plateable" grade. Other objects and advantages of the invention will be in part apparent and in part pointed out in the description that follows.

DETAILED STATEMENT OF THE INVENTION

The plastic part to be metal coated is subjected to a preliminary treatment step comprising immersion of the part in an emulsion formed from a solvent and non-solvent for the plastic. The selection of each component of the emulsion is dependent upon the particular plastic treated and its solvation properties. The terms "solvent" and "non-solvent" are used in this specification in accordance with their known definitions. The major limitation on the selection of the emulsion components is that they be emulsifiable with each other. Water is the preferred non-solvent because it is non-toxic and inexpensive. The following table sets forth examples of suitable solvents for the more common plastics.

| Plastic | Solvent |
|---|---|
| Polyvinylchloride | Acetone/carbon disulfide, methyl ethyl ketone, toluene, xylene, methylene chloride, ethylene chloride, tetra-hydrofurfuryl alcohol, dioxane, cyclopentanone, etc. |
| Polystyrene and its copolymers with acrylonitrile (SAN) and acrylonitrile/butadiene (ABS). | Cyclohexane, cyclohexane/acetone, ethylcyclohexane, benzene, toluene, styrene, chloroform, tetrahydrofurfuryl alcohol, dioxane, methylethyl ketone, cyclohexanone, ethyl acetate, carbon disulfide, etc. |
| Polymethyl methacrylate | Benzene, toluene, xylene, methylene chloride, chloroform, ethylene dichloride, chlorobenzene, carbon tetrachloride, allyl alcohol, dioxane, acetone, methyl ethyl ketone, cyclohexane, etc. |
| Polyacrylonitrile | Maleic anhydride, acetic anhydride, dioxane, ethylene carbonate, propylene carbonate, N, N-dimethyloacetamide, etc. |
| Polyphenylene ether | Benzene, chloroform, styrene, toluene, xylene etc. |
| Polycarbonate | Chloroform, acetone, benzene, methylene dichloride, dichlorobenzene, etc. |

Further examples of both solvents and non-solvents for plastics are known to those skilled in the art and have been compiled by J. Brandrup and E. H. Immerquist, Polymer Handbook, Interscience Publishers, 1966, IV–185, incorporated herein by reference.

The ratio of solvent to non-solvent is critical to the extent that sufficient non-solvent must be used to form the external phase of the emulsion with the solvent being dispersed in the form of minute droplets as the internal phase. This is, of course, dependent upon the properties of the materials used. In general, the solvent phase may constitute from about 1.0% by volume of the total emulsion up to that amount that would cause the solvent to form the external phase of the emulsion. Though not wishing to be bound by theory, it is believed that the solvent, in the form of minute droplets insulated from each other by a film of non-solvent, is deposited on the surface of the plastic, and through a solvating action, forms a multitude of minute pores on its surface. The insulating film of non-solvent protects the remainder of the plastic surface, thus preventing loss of structural integrity, crazing and softening of the plastic part. Disappearance of gloss or deglazing is one visible effect of the emulsion on the plastic.

If desired, and in order to control solvent strength, a diluent, insoluble in the external phase, and a non-solvent or weak solvent for the plastic may be mixed with the solvent phase. For water emulsions, kerosene may be used with many plastics.

Immersion of the plastic part in the emulsion is for a time and at a temperature dependent upon the strength of the solvent phase, stronger solvents requiring a shorter time and lower temperatures and weaker solvents requiring longer times and higher temperatures. In practice, it has been found that for emulsions formed from good solvents, the emulsion temperature may vary between room temperature and the temperature at which the emulsion breaks, room temperature being preferred, and the time of immersion may vary between 5 seconds and 30 minutes.

It is preferred that the emulsion be stable for a period of time at least equal to the time of immersion of the plastic part in the emulsion and emulsifying agents may be used to facilitate the dispersion. Examples of suitable emulsifying agents include lauryl sulfate, sorbitan tristearate, ethylene glycol, fatty acid esters, glycerol monostearate, talloil fatty acid soaps of high rosin content, calcium sulfate, etc.

Following treatment with the emulsion, it is preferable that the treated plastic be heat treated either in air or by hot water soak for a period of time from 5 seconds up to 30 minutes. The heat treatment temperature may vary between 50° F. and the softening point of the plastic, preferably between 125° F. and 165° F.

Following the above-described emulsion treatment, the plastic may be metal coated by any of several procedures. Such procedures are known and are disclosed, for example, in U.S. Patent No. 3,011,920, incorporated herein by reference.

For plating plastics, especially for obtaining adherent, bright decorative coatings without substantial polishing, it is known that a preliminary treatment of surface conversion with an aqueous surface converter, preferably an oxidizing surface converter, is highly desirable. Suitable surface converters comprise sulfuric acid and a source of hexavalent chromium ions, for example $CrO_3$, or acid soluble dichromates such as alkali metal dichromates and acid permanganate solutions. Procedures for surface converting plastics and additional surface conversion compositions are described, for example, in Product Finishing, April 1966, at pages 63 et seq.; Plating, October 1965, pages 982, et seq.; Product Finishing, April 1964, pages 147 et seq.; and elsewhere.

Following the surface conversion step, the part is optionally treated with a neutralizing agent to provide basic groups on its surface, sensitized to render it catalytic to the reception of an electroless deposit, for example by the composition of Example 2 of U.S. Pat. No. 3,011,920, optionally treated with an acid accelerator as disclosed in said patent, electrolessly plated, for example with known copper or nickel solution and thereafter electrolytically plated with copper, nickel or other desired metals. A bright, smooth, highly adherent coating is obtained requiring little or no polishing for decorative purposes.

The invention is further illustrated by the following examples.

Example 1

An emulsion was prepared of the following composition:

| | Parts by volume |
|---|---|
| Water | 50 |
| Methylene chloride | 10 |
| O-dichlorobenzene | 32 |
| Emulsifier | 8 |

The emulsifier used was a potassium salt of talloil with 40–45% rosin fatty acid content.

An aromatic polysulfone obtained from Union Carbide is immersed in the above emulsion at room temperature for 8 minutes. Following cold water rinse, the part is found to be hard with no visible surface irregularities.

To evaluate the emulsion treatment, the part is metal plated in accordance with known procedures as follows.

(1) *Surface conversion.*—Immerse part in a solution of sulfuric acid (dilute) and a source of hexavalent chromium ions for 10 minutes at 90° F. Cold water rinse.

(2) *Neutralize.*— Immerse in a 5% solution of ethylene diamine for 1 minute.

(3) *Catalysis.*—Immerse in a colloidal palladium solution maintained at room temperature for 5 minutes. The solution used was identified by the trademark Cuposit catalyst 6F of Shipley Company. Cold water rinse.

(4) *Accelerate.*—Immerse in perchloric acid solution for 2 minutes. Cold water rinse.

(5) Metal deposition.—Immerse in an electroless copper deposition solution maintaned above pH 12 for 8 minutes. The solution was identified by the trademark Cuposit Copper Mix 97 of Shipley Company and contained formaldehyde, complexed copper and a complexing agent. Rinse thoroughly and dry.

(6) Electroplate.—Electroplate copper over the electroless copper coating.

The above procedure results in metal coating over the plastic part with bond strength between coating and substrate approximately 44.5 lbs. per 1 inch width for a coating having a thickness of approximately 2.5 mils.

The procedure was repeated with the substitution of an electroless nickel solution maintained above pH 7.5. The solution used was identified by the trademark Cuposit Electroless Nickel 66 21 of Shipley Company and contained a nickel salt, sodium hypophosphite and a complexing agent. All other conditions remained the same. Bond strength of approximately 34.0 pounds per inch width was obtained.

The procedure was again repeated with the substitution of an ethylene dichloride solvent phase for methylene chloride, all other condtions remaining the same. Similar results were obtained.

The procedure may be repeated with variations of conditions within the defined limits to form metal coated polysulfones with bond strengths between coating and substrate ranging between about 20 and 45 pounds per inch width.

Repetition of the procedure with the substitution of o-dichlorobenzene or methylene chloride for emulsion results in softening and deformation of the plastic and difficulty to the extent that plating was impractical.

Repetition of the procedure without emulsion treatment resulted in a non-adherent electroless deposition.

Example 2

The process of Example 1 was repeated with the substitution of a polyphenylene ether trademarked PPO by the General Electric Company for the polysulfone, all the steps remaining the same. Bond strength between metal coating and plastic substrate was 15.0 lbs./per inch width for a coating having a thickness of about 2.5 mils. Substitution of either o-dichlorobenzene or methylene chloride for emulsion causes dissolution of the plastic surface making deposition of a metal coating impractical. An electroless deposition coating was not obtained when the procedure was repeated with elimination of the emulsion treatment.

Example 3

An emulsion was prepared having the following composition.

| | Parts by volume |
|---|---|
| Water | 55 |
| o-Dichlorobenzene | 36 |
| Emulsifier | 9 |

The emulsifier used was a potassium salt of talloil with 40–45% rosin fatty acid content.

A polycarbonate trademarked Lexan by the General Electric Company was immersed in the above emulsion at room temperature for 5 minutes and cold water rinsed. The surface of the polycarbonate is found to be deglazed, but otherwise visibly unaffected by the emulsion. The part is then metal plated as follows.

(1) Surface conversion I.—Immerse in alkaline conditioning solution formed from caustic soda, sodium nitrite and sodium nitrate and wetting agent for 5 minutes at 120° F. Cold water rinse.

(2) Surface conversion II.—Immerse in a solution of a predominant amount of phosphoric acid and minor amounts of nitric acid and sodium dichromate for 5 minutes at 120° F. Cold water rinse.

(3) Catalysis.—Immerse in a colloidal palladium solution of Example I for 2 minutes at room temperature. Cold water rinse.

(4) Accelerate.—Immerse in a perchloric acid solution for 2 minutes. Cold water rinse.

(5) Metal deposition.—Immerse in a Cuposit Electroless nickel 66 21 for 5 minutes as in Example 1. Cold water rinse.

(6) Electroplate.—Electroplate bright copper over the nickel coating.

A composite having a smooth lustrous coating with a bond strength of 43.0 lbs. per inch width is obtained.

The procedure can be repeated with variations in conditions within the defined limit with the formation of metal plated plastic having bond strengths between substrate and coating consistently ranging between about 15 and 43 lbs. per inch width.

Substitution of o-dichlorobenzene for emulsion results in dissolution of the polycarbonate surface. Elimination of the emulsion treatment resulted in a metal coating that was highly blistered and non-adherent.

Example 4

An acrylonitrile-butadiene-styrene copolymer was immersed in an emulsion of 80 parts by volume water, 16 parts by volume o-dichlorobenzene and 4 parts by volume of a potassium salt of talloil with 40–45% resin fatty acid content for 3 minutes at room temperature and then in water maintained at about 140° F. for 3 minutes. It was metal plated in the manner set forth in Example 1 with the substitution of a 50% HCl neutralizer for ethylene diamine and a nickel deposition bath for the copper deposition bath. Bond strength of 25.0 lbs. per inch width was obtained. Similar results are obtained when any of nitrobenzene, chlorobenzene, chlorotoluene, toluene or benzyl chloride are substituted for o-dichlorobenzene. Repetition of the procedure with variation of conditions within the defined limits consistently results in bond strength ranging between about 15 to 40 lbs. per inch width. These results are obtained with both "plateable" and "non-plateable" ABS copolymers.

Example 5

The procedure of Example 4 was repeated with an alloy of an acrylonitrile-butadiene-styrene copolymer and a polycarbonate. Minimum bond strength obtained was 12 lbs. per inch width.

As an additional advantage of this invention, it is noted that in each of the examples, the temperature of surface conversion is substantially lower than in the prior art.

This is a distinct advantage because elevated temperatures result in warping and deformation of the plastic part. Also, the rate of reduction of hexavalent chromium to trivalent chromium is slower resulting in easier control of the conversion solution and lower cost.

It should be understood that the foregoing description is for the purpose of illustration only and that the invention includes all modifications falling within the scope of the appended claims.

I claim:

1. In a process for depositing a conductive adherent metallic coating over plastic, the improvement comprising a preliminary treatment of contacting the plastic surface with a liquid-liquid emulsion having an external phase that is a non-solvent for the plastic and an internal phase that is emulsifiable with the external phase and is an organic solvent for the plastic, said contact being for a period sufficient to deglaze said plastic surface without formation of substantial visible surface irregularities.

2. In a process for depositing a conductive, adherent metallic coating over plastic, including surface converting the plastic to ensure an intermediate bond, sensitizing the plastic to render it catalytic to an electroless metal deposit and electrolessly depositing a metal coating over the plastic, the improvement comprising a preliminary treatment of contacting the plastic surface with a liquid-liquid emulsion having an external phase that is a non-solvent for the plastic and in internal phase that is emulsifiable with the external phase and is an organic solvent for the plastic, said contact being for a time sufficient to deglaze said plastic surface without formation of substantial visible surface irregularities.

3. In a process for depositing a conductive, adherent metallic coating over a water-insoluble synthetic plastic, the improvement comprising a preliminary treatment of contacting the plastic surface with a liquid-liquid emulsion having an aqueous external phase; an internal phase that is emulsifiable with the aqueous external phase and is an organic solvent for the plastic, and an emulsifying agent, said contact being for a time sufficient to deglaze said plastic surface without formation of substantial visible surface irregularities.

4. In a process for depositing a conductive, adherent metallic coating over a water-insoluble synthetic plastic, including the steps of surface conversion of said plastic with an oxidizing solution to ensure an intermediate bond, sensitizing the plastic to render it catalytic to an electroless metal deposit and electrolessly depositing a metallic coating over said plastic, the improvement comprising a preliminary treatment step of contacting the surface of said plastic with a liquid-liquid emulsion having an aqueous external phase, an internal phase that is emulsifiable with the aqueous external phase and is an organic solvent for said plastic and an emulsifying agent, said contact being for a time sufficient to deglaze said plastic surface without formation of substantial visible surface irregularities.

5. The process of claim 4 where the emulsion is a stable emulsion and contains an emulsifying agent.

6. The process of claim 4 where contact time of the plastic with the emulsion is for at least 5 seconds.

7. The process of claim 4 where the solvent phase of the emulsion contains a diluent that is immiscible with water and a non-solvent or weak solvent for the plastic.

8. The process of claim 4 including heat treatment of the plastic subsequent to contact with the emulsion for a time and at a temperature sufficient to remove residual emulsion from the surface of said plastic.

9. The process of claim 8 where heat treatment is a hot water soak for at least 30 seconds.

10. Metal coated plastic formed by the process of claim 4.

11. Metal coated plastic formed by the process of claim 4 further including an electrolytically deposited metal coating.

12. The process of claim 4 where the emulsion is formed from water and a solvent for a polysulfone and the plastic is a polysulfone.

13. The process of claim 12 where the solvent is selected from the group consisting of o-dichlorobenzene, methylene chloride and mixtures thereof.

14. The process of claim 12 where the emulsion contains a diluent that is immiscible with water and a nonsolvent or weak solvent for the polymer.

15. The process of claim 12 further including the step of electroplating the plastic following electroless deposition.

16. Metal coated polysulfone formed by the process of claim 12.

17. The process of claim 4 where the emulsion is formed from water and a solvent for a polyphenylene ether and the plastic is a polyphenylene ether.

18. The process of claim 17 where the solvent is selected from the group consisting of a o-dichlorobenzene, methylene chloride, and mixtures of o-dichlorobenzene and methylene chloride.

19. The process of claim 17 where the emulsion contains a diluent that is immiscible with water and a nonsolvent or weak solvent for the polymer.

20. The process of claim 17 further including the step of electroplating over the plastic following electroless deposition.

21. Metal coated polyphenylene ether formed by the process of claim 17.

22. The process of claim 4 where the emulsion is formed from water and a solvent for a polycarbonate and the plastic is a polycarbonate.

23. The process of claim 22 where the solvent is o-dichlorobenzene.

24. The process of claim 22 where the emulsion contains a diluent that is immiscible with water and a nonsolvent or weak solvent for the plastic.

25. The process of claim 22 further including the steps of electroplating over the plastic part following electroless deposition.

26. Metal coated polycarbonate formed by the process of claim 22.

27. In a process for depositing a conductive, adherent metal coating over an acrylonitrile-butadiene-styrene copolymer including the steps of surface conversion of said copolymer with an oxidizing solution to promote an intermediate bond, sensitizing said copolymer to render it catalytic to an electroless metal deposit and electrolessly depositing a metallic coating over said polymer, the improvement comprising a preliminary treatment of contacting said copolymer surface with a liquid-liquid emulsion consisting essentially of an aqueous external phase and an internal phase that is emulsifiable with said aqueous external phase and is an organic solvent for said copolymer, said contact being for a time sufficient to deglaze said copolymer surface without formation of substantial visible surface irregularities.

28. The process of claim 27 where the solvent is o-dichlorobenzene.

29. The process of claim 27 where the emulsion contains a diluent that is immiscible with water and a nonsolvent or weak solvent for the polymer.

30. The process of claim 27 further including the step of electroplating over the plastic following electroless deposition.

31. Metal coated acrylonitrile-butadiene-styrene copolymer formed by the process of claim 27.

References Cited

UNITED STATES PATENTS

| | | | |
|---|---|---|---|
| 2,843,497 | 7/1958 | Stuckey et al. | 106—287 |
| 3,262,899 | 7/1966 | Armour et al. | 8—115.6 |

FOREIGN PATENTS

| | | | |
|---|---|---|---|
| 1,003,575 | 9/1965 | Great Britain | 117—47R |

OTHER REFERENCES

Condensed Chemical Dictionary, seventh edition, Reinhold Corp., 1966, p. 370.

JOHN H. MACK, Primary Examiner

R. J. FAY, Assistant Examiner

U.S. Cl. X.R.

117—47; 156—2; 204—20, 38